April 26, 1960

M. G. PASOTTI 2,933,953

SPEED CONTROL FOR AUTOMOTIVE GENERATORS

Filed July 21, 1958

INVENTOR.
MICHAEL G. PASOTTI.

BY
Lockwood, Galt, Woodard & Smith.
ATTORNEYS.

United States Patent Office 2,933,953
Patented Apr. 26, 1960

2,933,953
SPEED CONTROL FOR AUTOMOTIVE GENERATORS

Michael G. Pasotti, Muncie, Ind.

Application July 21, 1958, Serial No. 749,978

3 Claims. (Cl. 74—752)

This invention relates generally to generator controls, and in particular to a speed responsive control for preventing the output of an automobile generator from falling below a predetermined value because of variable generator speed.

In the past one of the primary problems in providing suitable ignition systems for automobiles has been to prevent the overcharging of the auto battery. Various means, such as third brush regulation on the generator, have been utilized to limit the generator output at high engine speeds. Because of the relatively few electrically powered accessories utilized on automobiles in the past, there was no requirement for maintaining generator output at a relatively high value during idling of the automobile engine.

Modern automobiles utilize an increasing number of electrically-powered auxiliary devices such as heaters, air conditioners, windshield wipers, radios and the like. With the increase in the number of these devices in use, it has become increasingly important to assure that a proper charge is maintained on the auto battery and that the power supplied to the auxiliary devices is properly maintained during prolonged idling of the automobile engine.

The control of the present invention provides a means responsive to the engine speed which increases the speed of the generator whenever the engine speed falls below a predetermined value. The generator is thus maintained at proper speed even though the automobile engine is idled for prolonged periods as is often necessary in congested traffic or at railroad crossings.

It is thus an object of the present invention to provide a control which prevents an automobile generator from falling to undesirably low speeds when the automobile engine is idled.

A further object of the present invention is to provide a coupling for a driving and driven shaft wherein the speed ratio between the shafts is altered in response to the speed of the driving shaft.

The full nature of the invention will be understood from the accompanying drawings and the following description and claims:

Figure 1:
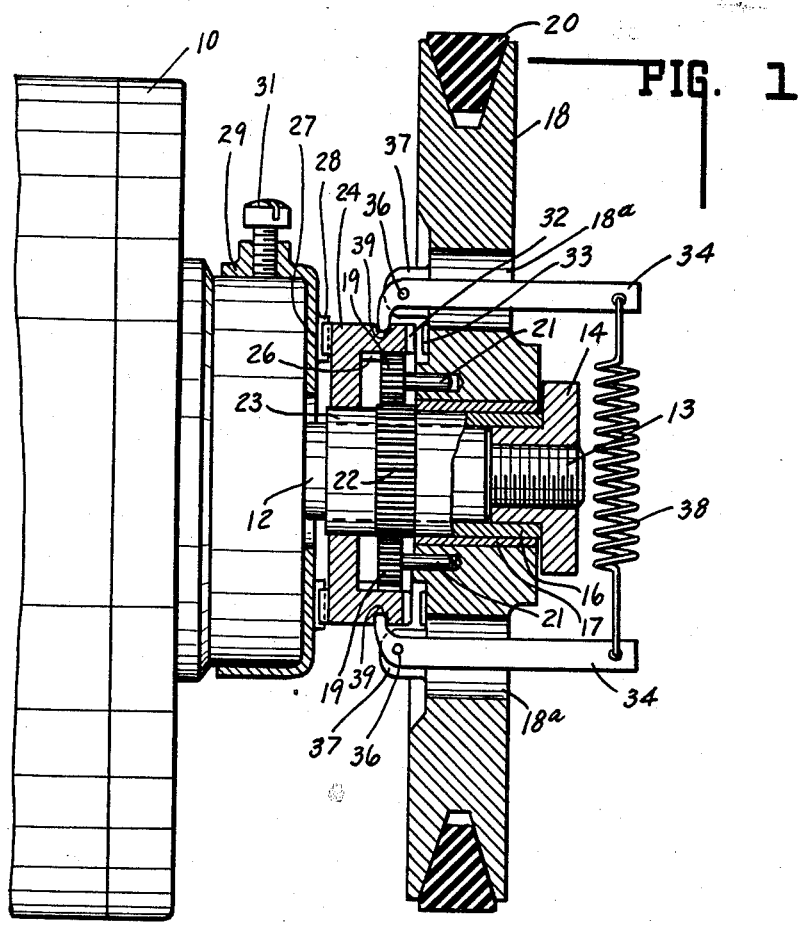
Fig. 1 is a side sectional view of a speed control embodying the present invention.

Referring initially to Fig. 1, there is shown fragmentarily at 10 a conventional automobile generator having an armature shaft 12. The drive shaft has a reduced threaded outer end 13 upon which is carried a retainer 14. The retainer serves to position on the shaft a sleeve 16 providing a bearing surface 17. The bearing surface supports a rotating member which may take the form of a V-belt pulley 18. The pulley is freely rotatable about the bearing surfaces 17 and is conventionally belted to an automobile engine crank shaft (not shown) and therefore, rotates at a speed corresponding to the engine speed.

The pulley is coupled to the generator shaft 12 by means of an epicyclic gearing assembly which includes a plurality of pinion gears 19 having axial shafts 21 which are rotatably supported in the hub of the pulley 18. For the purpose of clarity in the drawing two of the pinions are shown although a preferred form of the present invention utilizes three pinions equally spaced around the propeller hub. The pinions mesh with a driven gear 22 which is rigidly mounted upon the generator shaft 12 and has a smooth surfaced portion 23. The pinions are encircled by a ring gear 24 having an internally toothed portion 26 which further meshes with the pinions. The ring gear is supported on the portions 23 and is laterally shiftable thereon by means to be subsequently described.

The outer face of the ring gear is provided with a series of radial lugs 27 which engage similar radial lugs 28 carried by a cup-shaped member 29 which is rigidly mounted by a setscrew 31, or similar means, to the generator housing. The opposite face of the ring gear is provided with similar radial lugs 32 which are aligned with, and under certain conditions, engage the lugs 33 carried by the pulley hub.

The ring gear is adapted to be shifted from its position of Fig. 1, wherein the lugs 27 and 28 are in engagement to a position wherein these lugs are disengaged and the lugs 32 and 33 are in engagement. The means for providing this displacement of the ring gear includes a plurality of elongated members 34, having appreciable weight which are pivoted at 36 to support members 37 extending from the pulley. The members 34 extend through slots 18a in the pulley and their outer ends are biased toward the axis of the pulley by a tension spring 38. The opposite ends of the members 34 are formed so as to extend radially into a circumferential groove or notch 39 in the ring gear.

In operation, with the automobile engine, and consequentially the pulley 18, rotating at idling speed, the biasing force provided by spring 38 will be sufficient to position the members 34 so that the ring gear lugs 27 and the lugs 28 are in engagement. Under these conditions the ring gear will be held stationary and the pinion gears 19 will be caused to rotate about their own axes as they move around the driven gear 22. The driven gear 22 and the generator shaft will therefore be rotated at a speed exceeding the speed of the driving pulley. As the engine speed increases, at a critical speed depending upon the force exerted by spring 38, centrifugal force will pivot the members 34 outwardly. This movement of the members 34 will, by means of their cooperation with the groove 39, shift the ring gear rightwardly from its position of Fig. 1 to a position wherein the lugs 32 engage the lugs 33 carried by the pulley. When these lugs are engaged, the ring gear will be rotationally locked to the pulley. Under these conditions the pinion gears will be prevented from rotating about their own axes and will thereby provide a direct drive between the pulley and the driven gear. Any further increase in speed beyond this critical value will not alter the speed ratio, but will only serve to urge the ring gear more firmly into engagement with the pulley.

Figure 2:
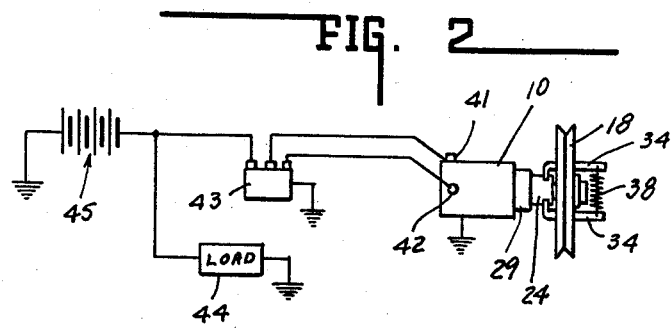
Fig. 2 is a schematic view of an automobile electrical system incorporating a generator equipped with the speed control of the present invention.

Fig. 2 illustrates a conventional schematic circuit which may be utilized with a generator provided with the control of the present invention. The generator 10 may be of the conventional third brush type having an armature terminal 41 and a field terminal 42. The generator terminals are connected to a conventional combination cutout relay and a voltage regulator indicated at 43. The battery terminal of the regulator may be connected to a series of load devices indicated schematically at 44 and to the positive side of the auto battery 45. In this circuit the cutout relay will perform its conventional function of disconnecting the generator from the battery when the automobile is not running and the regulator will perform its conventional function of inserting resistance in the generator field when a lower generator voltage and output are required. Under conditions where the automobile engine must be idled for prolonged periods and numerous electrical accessories are maintained energized, the speed control of the present invention will assure that the generator speed is maintained sufficiently high to provide the required power output for the load devices and to prevent excessive discharge of the automobile battery.

It will be evident that the control herein described is formed of a minimum of parts and can, therefore, be economically manufactured. The pulley and associated parts may be conveniently mounted on the generator shaft after the conventional drive pulley has been removed. The control of the present invention may thus be easily added to existing installations. It will be further evident that the pinion gears, ring gear and driven gear might be so proportioned that the generator would be driven at a speed fast enough to maintain the charge on the battery during engine idling even though a full complement of accessories are energized by the automobile's electrical system. It will be further evident that the ring gear 24 might be formed of nylon or similar material, thereby reducing the lubrication which might be required, and minimizing noise generated in operation of the control.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A generator speed control system including a generator having a housing and an armature shaft, a variable speed source of mechanical power, a driving pulley adapted to be rotated by said power source, an epicyclic gearing assembly between said generator and said driving pulley, said gearing assembly including a driven gear coaxially mounted with said pulley and fixed upon the armature shaft of said generator, free-rotating pinion gears meshing with said driven gear and carried by said pulley, a ring gear encircling said pinion gears and having an internally toothed portion meshing therewith, an annular cup-shaped member surrounding the armature shaft and fixed to said generator housing, projections extending from said cup-shaped member toward said pulley, said ring gear being shiftable between a first position wherein it is locked against rotation by engaging the projections of said cup-shaped member and a second position wherein it is rotated with said pulley, and means responsive to the speed of rotation of said pulley for shifting said ring gear including members carried by said pulley biased to urge said ring gear into its said first position, said members being moved by centrifugal force sufficient to overcome said bias to shift said ring gear to its second position, whereby for speeds of said pulley above a critical value a direct drive is maintained with said driven gear and for pulley speeds below a critical value the speed of said driven gear is increased with relation to said pulley speed.

2. A generator speed control system for a generator having a housing and an armature shaft including a variable speed source of mechanical power, a driving pulley adapted to be rotated by said power source, an epicyclic gearing assembly between said generator and said driving pulley, said gearing assembly including a driven sleeve gear coaxially mounted with said pulley and adapted to be mounted upon the armature shaft of the generator for rotation therewith, free-rotating pinion gears meshing with said driven gear and carried by said pulley, a projecting member adapted to be fixed to said generator housing in such a manner as to extend toward said pulley, a ring gear encircling said pinion gears and having an internally toothed portion meshing therewith, said ring gear being shiftable between a first position wherein it is locked against rotation by engaging said projecting member and a second position wherein it is rotated with said pulley, and means for shifting said ring gear including members carried by said pulley biased to urge said ring gear into its said first position, said members being adapted to be moved to overcome said bias and shift said ring gear to its second position, whereby a direct drive may be maintained between said pulley and said driven gear or the speed of said driven gear may be increased with relation to said pulley speed depending upon the position of said members.

3. A speed control for automotive generators having a housing and an armature shaft and adapted to alter the speed ratio between the auto engine and the generator in response to engine speed, said control comprising a driven pulley adapted to be rotated by the auto engine and mounted for free rotation on the generator shaft, a driven gear carried on the generator shaft adjacent said pulley and adapted to rotate with said shaft, a plurality of pinion gears extending laterally from said pulley and mounted for free rotation thereon, said pinion gears meshing with said driven gear, a ring gear shiftable between limiting positions on said generator shaft and having an internally toothed portion meshing with said pinion gears, an annular cup-shaped member surrounding the armature shaft, fixed to the generator housing and providing stationary abutments engageable with said ring gear in one of its positions to prevent rotation thereof, means carried by said pulley engageable with said ring gear in the other of its positions to rotationally lock said ring gear to said pulley, and means responsive to the speed of rotation of said pulley for shifting said ring gear including members carried by said pulley biased to urge said ring gear into its said one position, said members being moved by centrifugal force sufficient to overcome said bias to shift said ring gear to its said other position, whereby for speeds of said pulley above a critical value a direct drive is maintained with said driven gear and for pulley speeds below a critical value the speed of said driven gear is increased with relation to said pulley speed.

References Cited in the file of this patent

UNITED STATES PATENTS

| | | |
|---|---|---|
| 2,187,181 | Shackelford | Jan. 16, 1940 |
| 2,198,072 | Banker | Apr. 23, 1940 |
| 2,266,164 | Claytor | Dec. 16, 1941 |
| 2,375,785 | Goode et al. | May 15, 1945 |
| 2,815,974 | Stubbe | Dec. 10, 1957 |
| 2,828,652 | Bell | Apr. 1, 1958 |